(12) United States Patent
Mohindra et al.

(10) Patent No.: US 9,104,798 B2
(45) Date of Patent: Aug. 11, 2015

(54) ENABLING REMOTE DEBUGGING OF VIRTUAL MACHINES RUNNING IN A CLOUD ENVIRONMENT

(71) Applicant: International Business Machines Corporation, Armonk, NY (US)

(72) Inventors: Ajay Mohindra, Yorktown Heights, NY (US); Sambit Sahu, Hopewell Junction, NY (US); Upendra Sharma, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/886,414

(22) Filed: May 3, 2013

(65) Prior Publication Data

US 2014/0331089 A1  Nov. 6, 2014

(51) Int. Cl.
*G06F 11/07* (2006.01)
*G06F 11/36* (2006.01)

(52) U.S. Cl.
CPC ................... *G06F 11/362* (2013.01)

(58) Field of Classification Search
CPC ...................................... G06F 11/362
USPC ................................ 714/6.31, 38.14
See application file for complete search history.

(56) References Cited

U.S. PATENT DOCUMENTS

| | | | |
|---|---|---|---|
| 6,637,024 B1 * | 10/2003 | Johnson et al. | 717/124 |
| 6,986,124 B1 * | 1/2006 | Field et al. | 717/124 |
| 2002/0129337 A1 * | 9/2002 | Evans et al. | 717/124 |
| 2004/0123271 A1 * | 6/2004 | Bindewald et al. | 717/124 |
| 2005/0172168 A1 * | 8/2005 | Kilian | 714/31 |
| 2007/0288939 A1 * | 12/2007 | Stall | 719/328 |
| 2009/0094603 A1 | 4/2009 | Hiltgen et al. | |
| 2009/0300423 A1 | 12/2009 | Ferris | |
| 2011/0061042 A1 * | 3/2011 | Deshmukh et al. | 717/124 |
| 2011/0161947 A1 * | 6/2011 | Ashok et al. | 717/168 |
| 2011/0225459 A1 | 9/2011 | Fahrig et al. | |
| 2011/0302415 A1 | 12/2011 | Ahmad et al. | |
| 2012/0131555 A1 * | 5/2012 | Hossain et al. | 717/124 |
| 2012/0192154 A1 * | 7/2012 | Alpern | 717/124 |
| 2013/0042153 A1 * | 2/2013 | McNeeney | 714/38.1 |
| 2013/0258901 A1 * | 10/2013 | Kawai | 370/254 |
| 2014/0173565 A1 * | 6/2014 | Scholl et al. | 717/124 |
| 2014/0258985 A1 * | 9/2014 | Yawn et al. | 717/125 |

(Continued)

OTHER PUBLICATIONS

Anonymous, Intelligent Suspension of Self-Management Characteristics of Cloud Deployed Solutions to Allow Manual Intervention or Maintenance of Virtual Machines, Apr. 3, 2012, http://priorartdatabase.com/IPCOM/000216388.

(Continued)

*Primary Examiner* — Chae Ko
(74) *Attorney, Agent, or Firm* — Scully, Scott, Murphy & Presser, P.C.; Louis C. Percello, Esq.

(57) ABSTRACT

Enabling remote debugging of virtual machines, in one aspect, may comprise attaching a debug virtual machine to a target virtual machine deployed in a virtualized environment. Interactions and/or access to the target virtual machine may be performed via the attached debug virtual machine. The debug virtual machine may be created and attached to the target virtual machine in response to receiving a request to debug the target machine, for example, from a remote user of the target virtual machine.

9 Claims, 2 Drawing Sheets

(56) References Cited

U.S. PATENT DOCUMENTS

2014/0366004 A1* 12/2014 Cai et al. .................. 717/124
2015/0033205 A1* 1/2015 Wintergerst et al. .......... 717/124

OTHER PUBLICATIONS

Goguen, J. et al., Virtual Machine Debugging Module, Jul. 29, 2009, http://www.ip.com/pubview/IPCOM000185642D.

Basak, D. et al.; "Virtualizing Networking and Security in the Cloud"; Operating Systems Review, vol. 44, No. 4, pp. 86-94; Dec. 2010.

Amrhein, D. et al.; "Adopting Cloud Computing using the WebSphere CloudBurst Appliance": IBM Corporation; www.ibm.com/redbooks/redp4708; Redpaper; 2010.

* cited by examiner

ENABLING REMOTE DEBUGGING OF VIRTUAL MACHINES RUNNING IN A CLOUD ENVIRONMENT

FIELD

The present application relates generally to computer systems, and more particularly to remote debugging of virtual machines.

BACKGROUND

"Infrastructure as a service" (IaaS) cloud computing paradigm has changed the way information technology (IT) services are managed and delivered to the end consumer. In such a cloud environment, the cloud-service provider exposes application programming interfaces (APIs) and an end user makes use of these APIs to request for virtual server resources. The virtual servers are always provisioned with a specific operating system and in many situations even with a complete application stack over the operating system. Access to the virtual machine is usually enabled via secure shell (SSH) or X-Windows™ like interface, not a console. Existing remote management consoles are not designed to operate in a cloud kind of environment.

It has been often observed in the cloud environments that virtual servers become inaccessible because of various system level problems, namely kernel incompatibility, wrong boot-sequence such as incorrect startup sequence of system services, bad system or application configuration, etc. This renders the end user completely helpless as the user can neither determine the problem nor can fix it. This makes cloud-environments unsuitable for system development and testing purposes. In addition, it also makes the cloud service expensive and inefficient.

A known solution may attach a virtual network computing (VNC) port to the virtual machine and provide the remotely accessible address of the host machine to the end user. Another known solution may be to contact a system administrator to fix the problem for the user. Neither of the solutions is suitable for a cloud kind of environment because, e.g., the first discloses the host machine details to the end user, which process might make the host susceptible for hacking attacks. The second solution might be slow and expensive.

BRIEF SUMMARY

A method of enabling remote debugging of virtual machines, in one aspect, may comprise attaching a debug virtual machine to a target virtual machine deployed in a virtualized environment. The method may also comprise allowing interacting with the target virtual machine via the attached debug virtual machine.

A system for enabling remote debugging of virtual machines, in one aspect, may comprise a target virtual machine deployed in a virtualized environment. A debug virtual machine may be attached to the target machine, in response to receiving a request to debug the target virtual machine. The debug virtual machine allows a remote user of the target virtual machine to interact with the target virtual machine.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one aspect of the present disclosure, one or more methods and systems are presented that allow a machine to be remotely debugged by an end user without exposing the details of the host machine. Briefly, debugging refers to finding and/or fixing one or more problems or detects in a computer, for example, computer software program or computer hardware device. A methodology in one embodiment of the present disclosure not only enables remote debugging but can also be used as a service to the end user. In one embodiment, a customized virtual machine (VM) (called debugger VM) is created, which allows the end user to communicate with the hung-up VM (VM not functioning as it should) or another guest VM. For example, a debugger operating system is created and attached to an operating system to debug that operating system. The customized VM (debugger VM) allows the end user to communicate with the VMs (e.g., cloud VMs or guest VM on a hypervisor or the like operating in a cloud) during their life-cycle. In addition, a methodology of the present disclosure can expose extra capabilities to the debugger-VM, such as rebooting and kernel-level debugging of the hung-up VM or a guest VM.

A methodology of the present disclosure in one embodiment creates a new specialized or customized VM, which communicates with a hypervisor or the like, for one or more specialized provisions like rebooting one specific VM, attaching to the VNC port of the hung-up VM or guest VM. Briefly, a hypervisor refers to computer software, firmware or hardware that manages, e.g., creates and runs, virtual machines. A hypervisor allows multiple (same or different) operating systems to run on one hardware host (processor). In one embodiment of the present disclosure, the created VM (debug VM), via the hypervisor, obtains a serial port based access to the VM (guest VM) for performing a kernel level debugging of the accessed VM (e.g., guest VM). A debug VM may be considered a privileged VM that has the ability to connect to other virtual machines running under a virtualized environment.

In one aspect, a methodology of the present disclosure enables a console-like access to VMs, e.g., in a cloud environment, enabling services such as manipulating boot sequence, single user mode, interactive boot sequence, and real-time access to console messages.

Figure 1:
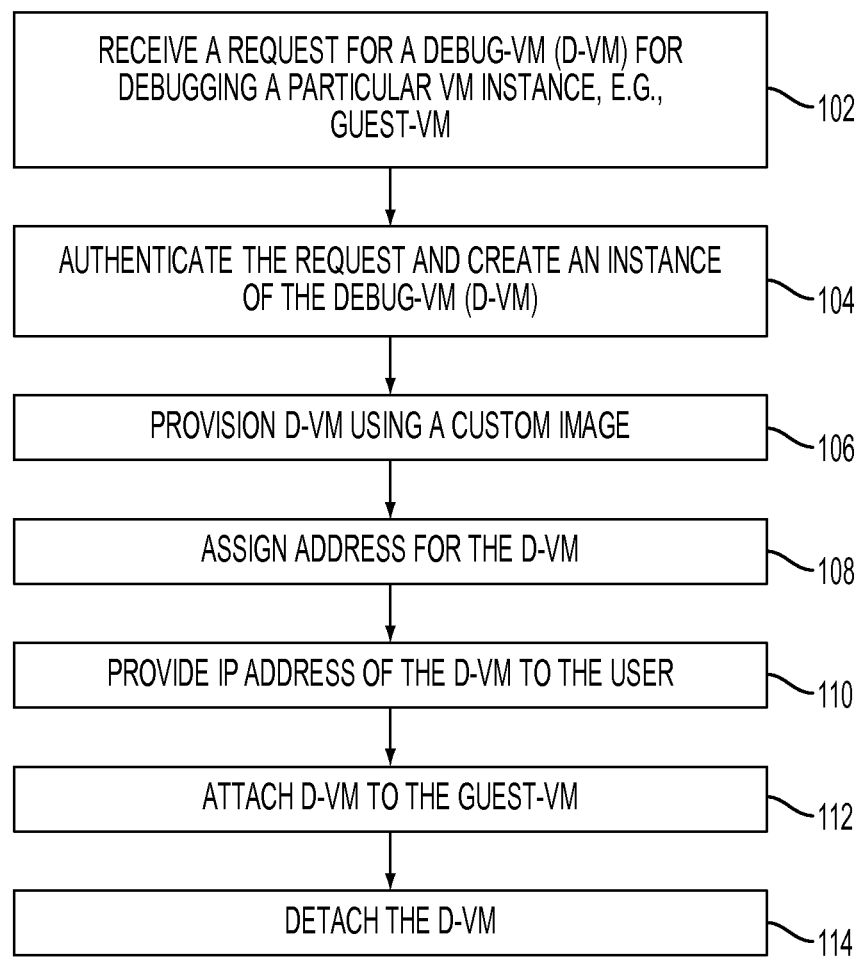
FIG. 1 is flow diagram illustrating a high-level method of the present disclosure in one embodiment.

FIG. 1 is flow diagram illustrating a high-level method of the present disclosure in one embodiment. At 102, a request is received for a debug-VM (D-VM) for debugging or communicating with a particular VM instance, e.g., Guest-VM (a guest VM, also referred to as a target VM). For instance, a user may make such request, e.g., via an appropriate user interface. A system providing a service of VMs, e.g., a cloud management system, that manages the provisioning of VMs to clients/customers, may receive the request for a D-VM.

At 104, the request is authenticated, e.g., by a cloud service, and an instance of a D-VM is created. For example, a user may be validated using the user identifier and/or other data to verify that the user has the authorization to create a debug VM on a host. Once authenticated, a replica of debug VM image is created and launched to create the debug VM.

In one embodiment of the present disclosure, D-VM is created to be a very light weight customized VM with pre-packaged custom debug tool. Instance of D-VM can be created on the same host as of the Guest-VM or on another host. In the case the instance of D-VM is created on another host, the communication between the host hypervisor may be performed over a network (for example, using an ssh-tunnel).

At 106, an instance of D-VM is provisioned using the D-VM image, e.g., using the cloud provisioning engine. For instance, a system that provides VMs or such services to users may include an application engine or module that is enabled to provision a debug VM. For example, a cloud management platform may have multiple services, namely image management, identity management and role based access control, and/or resource provisioning system (such as compute, storage network resource management systems). D-VM image may be stored and managed by image management system, e.g., of such cloud platform.

At 108, D-VM is assigned one or more addresses, e.g., a public and private Internet Protocol (IP) address.

At 110, the address (e.g., internet protocol (IP) address) of the D-VM is provided to the user. The D-VM has ports which would be attached to the Guest-VM, like serial and parallel ports. These ports are attached to the Guest-VM via the hypervisor. The serial and parallel ports of Guest-VM can be attached to the D-VM using, e.g., hypervisor exposed features on localhost, cKermit kind of programs over TCP/IP (e.g., in the case of remote host), or by another method.

The D-VM may also expose an interactive console access to the Guest-VM. The interactive console of Guest-VM can be exposed by D-VM by using ssh (secure shell) port forwarding. An example of interactive console may be a VNC console which can be attached to a remote virtual machine for providing a virtual-terminal/virtual-console like access to the virtual machine. The interactive console can be used by VNC to attach to the remote VMs.

At 112, special processes attach D-VM ports to the Guest-VM, e.g., via the hypervisor. For example, serial and parallel ports of the D-VM are attached to the Guest-VM for various kernel debugging with a custom kernel debugger implemented with the D-VM. Local-drives (local to the user) may be attached to the guest VM for utilizing crash-recovery tools (such as crash-recovery compact disks (CDs) or the like). Local drives, like compact disc (CD) and digital versatile disc (DVD) drives can be accessed by a remote VM via protocols like remote desktop protocol (RDP) or like methodology that allows connecting to another computer over a network connection.

A VM state manipulation step is performed such that the cloud management system is aware of it; this is primarily for ensuring consistency of the state of cloud recorded by cloud management system. A D-VM could change the state of the guest VM it is attached to by making appropriate calls to the cloud management system. For instance, when the VM is booting, a D-VM may attach itself to the guest VM and the user of D-VM may reboot the guest VM. In this way, a user may have full access to the guest VM via the D-VM.

At 114, once complete, the D-VM may be detached from the guest VM, e.g., by tearing down the tunnels/connections created by the hypervisors for attaching ports/sockets of D-VM with those of guest VM. After detaching the D-VM, it can de-provisioned.

Figure 2:
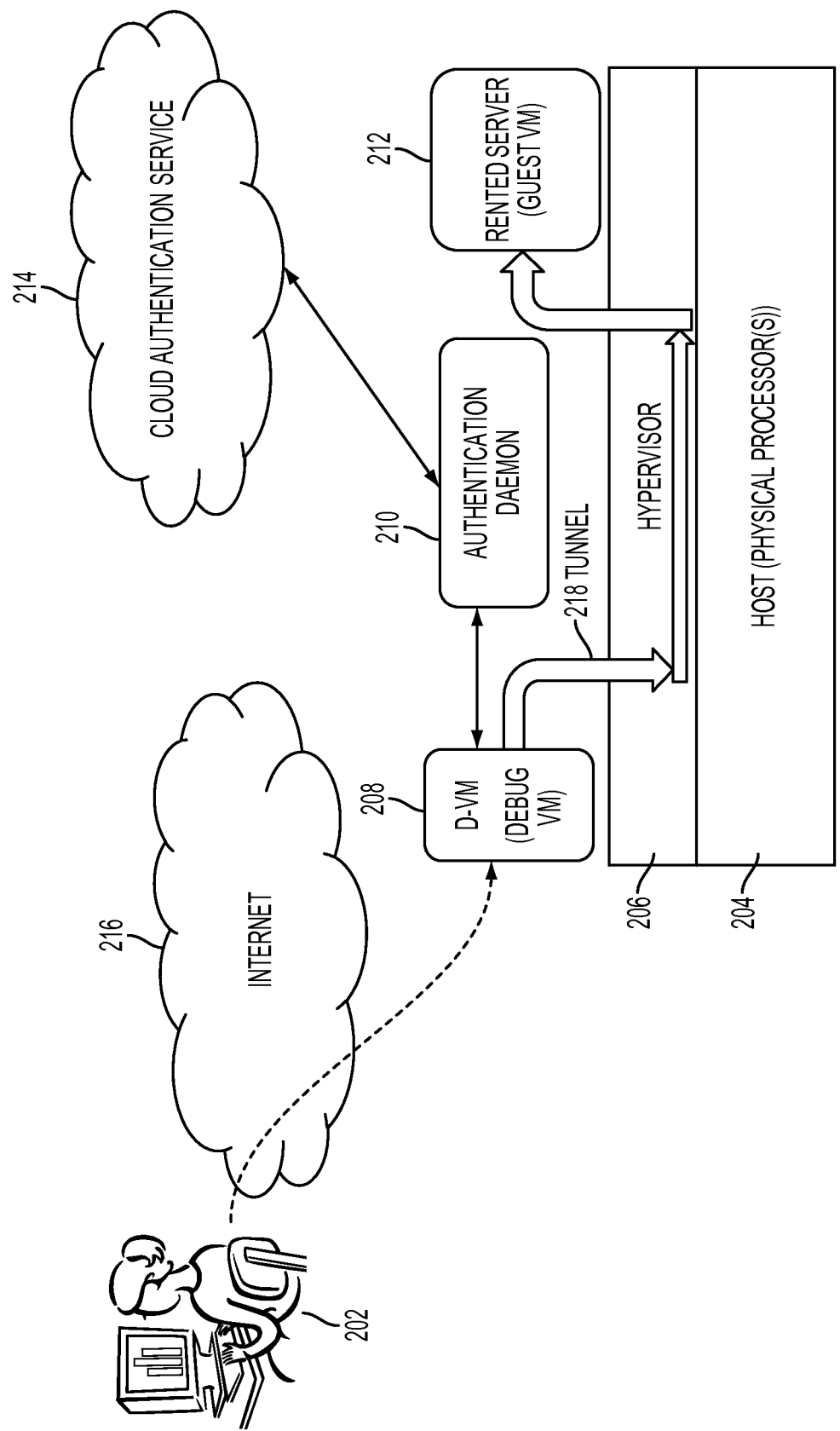
FIG. 2 is a diagram illustrating a system architecture overview of the present disclosure in one embodiment.

FIG. 2 is a diagram illustrating a system architecture overview of the present disclosure in one embodiment. A virtualized environment is illustrated in which a number of virtual machines may be running and, e.g., are serviced to remote clients. A host computer or processor 204 may be running a hypervisor 206 that manages one or more virtual machines, which virtual machines for instance may be allocated to an end user 202 as a rented server, e.g., guest VM 212. The hypervisor 206 may be multi-layered. For example, a hypervisor may host another hypervisor, which in turn hosts one or more virtual machines. In the process of using the guest VM 212, e.g., the user may need to debug that VM 212. The end-user 202 requests for a debug virtual machine (D-VM) 208. In response, an authentication daemon 210 or like process verifies or authenticates the user 202, e.g., using a cloud authentication service 214. The cloud authentication service 214, for example, may store a list of valid users and other information for validating users (e.g., user identifications). Once validated, an instance of a D-VM is created according to the guest VM. For example, a D-VM may be customized according to the type of guest VM, for instance, a D-VM for Linux operating system or D-VM for Windows™ operating system, etc. D-VM is provisioned using a custom image (e.g., VM image template), and is assigned an address, which is provided to the user 202.

The user 202 receives the D-VM address (e.g., IP address) and accesses the D-VM by logging into it and accessing the debugging software on D-VM to debug the processes on the guest VM instance 212, e.g., including the kernel of the guest VM 212.

Attachment of a debug VM 208 and a guest VM 212 may be via a tunnel 218. A tunnel is a connection established between operating systems, for example in FIG. 2, between the D-VM 208 and the guest VM 212 via one or more hypervisors 206. For instance, consider a situation where D-VM is provisioned on the hypervisor, which also hosts the guest VM. A tunnel 218 can be created using a common pipe (or socket) between the two VMs. This pipe/socket may be created and maintained by the hypervisor 206. Across different hypervisors (e.g., in cases where a D-VM and a guest VM are hosted on different hypervisors), this pipe/socket may be chained between the hypervisors over a network connection.

The end user 202 can attach to the D-VM 208 a VNC client and see the boot console of the Guest-VM 212. In case of a security problem the VM 212 may be isolated. In that case the DVM 208 can be attached and perform an interactive booting. In a case where disks may be corrupted, a VM on a reboot may ask for a file system check (fsck). In such cases, the D-VM may be attached and perform the fsck.

The attached D-VM 208 may be pre-configured with an appropriate stack depending on the debug situation at hand. For example, one or more debugger tools such as program compiler debugger (e.g., JAVA™ debugger, PHP software debugger) to debug a compiled or like program may be configured in the attached D-VM 208. Similarly, to solve potential disk problems that the guest VM 212 may have, one or more disk utilities that enable debugging of a disk driver associated with the guest VM 212 may be configured in the attached D-VM 208, which utilities would allow the D-VM 208 to examine the disk layout and perform any corrective operations. Thus, the end-user 202 may utilize one or more of the configured tools in the D-VM 208 to debug the guest VM 212.

The end user 202 can also configure the D-VM 208 with a tool or utility that is available locally at the end user 202. For example, the end user 202 may have a compact disk that contains a debug utility. The end user 202 may insert that compact disk on his or her computer device for the guest VM 212 to access, for example, via a remote protocol.

As another example, the end user 202 may attach a debugger (e.g., gdb, a standard debugger for GNU, a UNIX style operating system) for debugging various running processes and even a kernel running on the guest VM 202. The methodology of the present disclosure in one embodiment thus enables cloud environment conducive for kernel development and debugging. For example, a guest VM that has problems booting up may be accessed via a debug VM of the present disclosure, e.g., access the guest VM in its pre-boot stage to boot it and look for problems and solutions in the guest VM.

In the case of establishing remote Virtual Private Cloud (VPC) connections, there is not mechanism to know what the VPC is sending to a cloud-VM, e.g., guest VM 202. D-VM 208 can be attached and used to get the access of such information.

As an example, the D-VM of the present disclosure may be utilized in the following classes of problems, where there is inability to access the VM or VM-state.

| Problem Class | Problem Type | Minimum service needed to be up in Guest VM |
|---|---|---|
| Connectivity | General Connectivity | Kernel, device drivers, tty-service, login-service |
| | Firewall | Kernel, device drivers, tty-service, login-service, network-service |
| | Connection Performance | Kernel, device drivers, tty-service, login-service, network-monitoring-service |
| | Connection to App | Kernel, device drivers, tty-service, login-service, network-service, app |
| Performance | Instance not responding | Kernel, device drivers, tty-service, login-service |
| | Instance not shutting down | Kernel, device drivers, tty-service, login-service |
| | Storage resource problems | Kernel, device drivers, tty-service, login-service, device-monitoring-service |
| Virtualized Infrastructure | Storage resource related problem | Kernel, login-service |
| | Load Balancer related | Kernel, login, access to load-balancer |
| | DNS, Virt IP | Kernel, login, nework-service |
| Application | Configuration Problem | Kernel, login, app, monitoring-service |
| | Performance Problem | Kernel, login, app, monitoring-service |

In another aspect, the D-VM of the present disclosure may be used for application level problems like performance management of large distributed applications.

The methodology of the present disclosure may empower the user to revive the hung-up machine, for which she has already paid, reduce the problem resolution time, reduce the load on administrators in debugging mundane problems, and make the cloud or the like environment more usable to various developmental purposes.

The methodology of the present disclosure in one embodiment may facilitate debugging of one or more distributed applications deployed across multiple machines (e.g., virtual machines), debugging of operating system level bugs (problems, errors), for instance, device driver problems deployed on a remote platform (e.g., cloud platform/environment). The methodology of the present disclosure may also be used in cases where the guest VM is not accessible via SSH or other network services, which are typically available after successful loading of an operating system.

While the above description referred to a VM and D-VM provisioned in cloud type platform, the methodology of the present disclosure need not be limited to use only cloud environment. Rather, D-VMs may be created and attached to VMs in any other type of platforms, for example, where a service of VMs may be provided to users.

A computer or processing system may implement a methodology in one embodiment of the present disclosure. The processing system may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. The processor may include a module that performs the methods described herein. The module may be programmed into the integrated circuits of the processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. By way of example only, storage system can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. A network adapter communicates with the other components of computer system via bus. It should be understood that other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of enabling remote debugging of virtual machines, comprising:
    attaching a debug virtual machine to a target virtual machine deployed in a virtualized environment; and
    allowing interacting with the target virtual machine via the attached debug virtual machine,
    wherein the debug virtual machine allows an end user of the target virtual machine to access the target virtual machine during a pre-boot stage of the target virtual machine.

2. The method of claim 1, wherein the attaching is performed in response to receiving a request from an end user of the target machine to debug the target virtual machine.

3. The method of claim 2, wherein in response to the request, the debug virtual machine is created.

4. The method of claim 2, wherein one or more devices located locally at the end user are connected over a network to the target virtual machine via the debug virtual machine, wherein the debug virtual machine allows using one or more debugging utilities installed in the one or more devices to debug the target virtual machine.

5. The method of claim 1, wherein the attaching comprises creating a tunnel between the debug virtual machine and the target virtual machine.

6. The method of claim 1, wherein the debug virtual machine is pre-configured with one or more debug utilities, wherein the one or more debug utilitcs utilities are used to debug the target virtual machine.

7. The method of claim 1, wherein the debug virtual machine enables debugging of a distributed application deployed across multiple virtual machines.

8. The method of claim 1, wherein the debug virtual machine is created on a host machine where the target virtual machine is deployed.

9. The method of claim 1, wherein the debug virtual machine is created on a host machine different from a host machine where the target virtual machine is deployed.

* * * * *